United States Patent [19]

Trushenski

[11] 4,448,698
[45] May 15, 1984

[54] SELECTING SALINITIES IN MICELLAR FLOODING

[75] Inventor: Scott P. Trushenski, Broken Arrow, Okla.

[73] Assignee: Standard Oil Company, Chicago, Ill.

[21] Appl. No.: 938,131

[22] Filed: Aug. 30, 1978

[51] Int. Cl.$^3$ .............................................. C09K 3/00
[52] U.S. Cl. ............................... 252/8.55 D; 166/274; 166/275
[58] Field of Search ..................... 252/8.55 D, 8.55 R; 166/252, 274, 275

[56] References Cited

U.S. PATENT DOCUMENTS 3,480,080 11/1969 Murphy .......................... 252/8.55 D
4,258,789 3/1981 Hedges et al. .................. 252/8.55 D
4,330,418 5/1982 Glinsmann et al. ............ 252/8.55 D

*Primary Examiner*—Josephine Barr
*Attorney, Agent, or Firm*—Scott H. Brown; Fred E. Hook

[57] ABSTRACT

In the displacement of crude oil through a subterranean reservoir with an aqueous displacement fluid, improved oil recovery is obtained by providing a salinity contrast between the displacement fluid and aqueous formation fluid. The salinity of the displacement fluid is selected such that at least one mixture of the aqueous displacement and the aqueous formation fluid will have the minimum interfacial tension between the displaced crude oil and mixtures of these fluids. The minimum interfacial tension between crude oil and mixtures of aqueous displacement and formation fluids can be determined by mixing these fluids such that some mixtures contain from essentially none to essentially all displacement fluid and determining the interfacial tension between the mixtures and the crude oil. The displacement fluid is a micellar fluid followed by a polymer-containing aqueous fluid. Further improvements in oil recovery are obtained when this salinity contrast is provided and the salinity of the polymer-containing fluid is less than the salinity of the mixture which provides the minimum interfacial tension with the crude oil.

14 Claims, 1 Drawing Figure

SELECTING SALINITIES IN MICELLAR FLOODING

BACKGROUND OF THE INVENTION

Enhanced oil recovery refers to the displacement of fluids from an injection well penetrating a crude-oil containing subterranean reservoir toward a production well penetrating the reservoir. Many processes and compositions have been developed for improving the percentage of crude oil that can be produced by this technique.

Aqueous micellar fluids have been developed for displacing crude oil through subterranean reservoirs. These fluids contain appropriate and sufficient amounts of surfactant for micelle formation in the aqueous fluid to increase the efficiency which these fluids will displace crude oil. Aqueous formation fluids can be connate water, the water remaining in the reservoir following a water-flood or water which is injected ahead of the micellar fluid to displace water from the reservoir. Sufficient micellar fluid is injected to produce a micellar bank of about 3 to about 25 percent (%) of the total pore volume of the portion of the reservoir from which crude oil is to be displaced. Following the micellar bank, an aqueous polymer-containing fluid can be injected into the reservoir to displace the micellar fluid. The polymer-containing fluid generally has a relatively low mobility through the reservoir to aid in the displacement of the crude oil. Sufficient polymer-containing fluid is injected to provide a polymer bank or mobility buffer bank of about 30 to about 100 percent of the total pore volume of the portion of the reservoir from which crude oil is to be displaced.

The fluids in the micellar bank and the polymer bank are generally formulated to contain inorganic salts. The nature and amount of the inorganic salts in the formulation depends in part on the mineral content of the reservoir and on the salinity of the aqueous fluids being displaced. In the formulation of the micellar fluid, the salinity thereof can be selected so that the interfacial tension between the micellar fluid and the crude oil is below about 100 millidynes/cm and preferably as low as about 10 millidynes/cm or lower. Low interfacial tension aids in the displacement of the crude oil through the reservoir. In formulating the fluids in the polymer bank, the salinity of the polymer-containing fluid can be selected to reduce the loss of surfactant in the micellar bank which can occur when the polymer bank mixes with the micellar bank. This loss of surfactant in the reservoir can be reduced by formulatng the polymer containing fluid at a low salinity.

SUMMARY OF THE INVENTION

Crude oil is displaced through an oil-bearing subterranean reservoir containing aqueous formation fluid with an aqueous displacement fluid. The composition of the displacement fluid is selected such that the interfacial tension between the displacement fluid and crude oil changes as the displacement fluid mixes with aqueous formation fluid and one mixture of the displacement and formation fluid will have the minimum interfacial tension with the displaced crude oil. The displacement fluid is a micellar fluid followed by a polymer-containing aqueous fluid. The displacement fluid is followed by a drive fluid, usually water. The minimum interfacial tension between the crude oil and mixtures of aqueous displacement and formation fluid is preferably less than about 100 millidynes/cm and is most preferably about 10 millidynes/cm or less. In an embodiment of this invention, a salinity contrast is provided between the aqueous displacement and formation fluid. The salinity of the displacement fluid is selected such that at least one mixture of the aqueous displacement and formation fluids will have the minimum interfacial tension with the displaced crude oil. Further improvements in oil recovery are obtained when the salinity of the polymer-containing fluid component of the displacement fluid is less than the salinity of the mixture which provides the minimum interfacial tension with the displaced crude oil.

DETAILED DESCRIPTION

Figure 1:
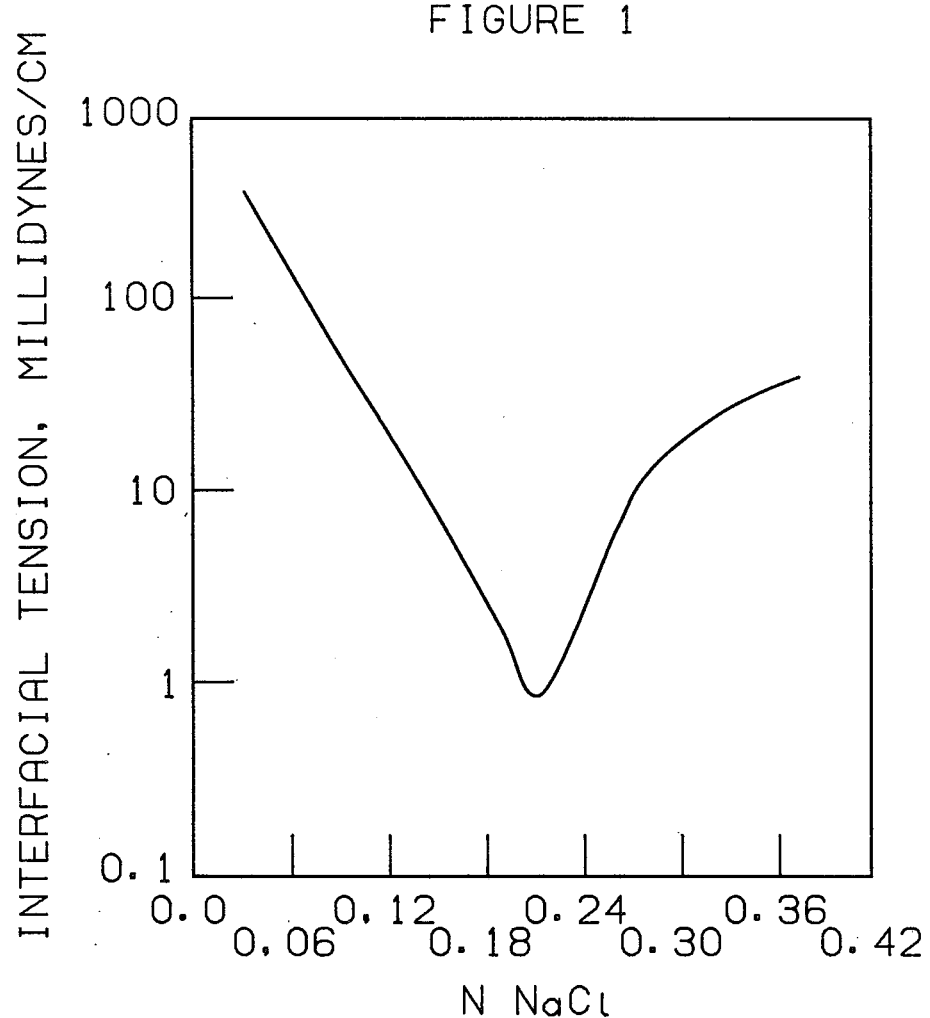
FIG. 1 shows the interfacial tension between oil and aqueous micellar fluids having different salinities.

It has been discovered that the mixing of aqueous formation fluid with displacement fluid, comprising aqueous micellar and polymer-containing fluids, can be used to improve the percentage of crude oil that can be recovered in an enhanced oil recovery project. By this method, the displacing fluid is selected such that as it mixes with increasing volumes of the formation fluid, the interfacial tension between the mixtures and the crude oil with change. Improved oil recovery occurs when the interfacial tension changes, such as from a high to a low interfacial tension or from a low to a high interfacial tension or from a high to a low and back to a high interfacial tension.

The displacement of crude oil with a micellar bank is enhanced when the interfacial tension between the micellar bank and the displaced crude oil is at a low value. Micellar fluids can be designed that have interfacial tensions as low as 1 millidyne per centimeter (cm) or lower. At these low interfacial tensions, the micellar fluid is substantially miscible with the displaced crude oil and very efficiently displaces the crude oil from the reservoir. The crude oil recovery efficiency of the micellar bank is decreased at higher interfacial tensions; however, micellar fluids have considerable crude oil displacement efficiency at interfacial tensions as high as about 100 millidynes per cm and are even more efficient at interfacial tensions of about 10 millidynes per cm.

It is known that changes in the salinity of a micellar bank can alter the interfacial tension between a micellar bank and crude oil and that the interfacial tension between the micellar bank and crude oil can be minimized by formulating the micellar fluid at the appropriate salinity. In one embodiment of this invention, the salinity of the micellar fluid is selected such that on mixing of the micellar fluid with aqueous formation fluid there will be a change in the salinity of the micellar fluid. This change in salinity will cause the interfacial tension between the crude oil and the micellar fluid to increase or decrease. If the micellar fluid is at an appropriate salinity for minimizing the interfacial tension between the micellar fluid and crude oil, mixtures of the micellar fluid with aqueous formation fluid of either higher or lower salinity will increase the interfacial tension. If the micellar fluid is at a lower salinity than required for minimizing the interfacial tension between the micellar fluid and the crude oil, mixtures of the micellar fluid with aqueous formation fluid of higher salinity will reduce the interfacial tension. If the salinity contrast between the aqueous formation and micellar fluids is appropriate, the interfacial tension between the micellar fluid and the crude oil will be reduced to a minimum and thereafter increased.

During the movement of the micellar fluid and polymer fluid through the reservoir, there can be mixing of the two fluids. Because of this mixing, these fluids will be referred to in this description as the displacing fluid or displacing bank. When the two fluids have different salinities, there will be changes in the salinity distribution within the displacement bank. In one embodiment of this invention, the salinity of the displacement bank is selected such that mixtures of the displacement bank and the aqueous formation fluid will have salinities different from the salinity of the displacement bank. The salinity of the displacement bank is selected such that one mixture of the bank with aqueous formation fluids will be at the minimum interfacial tension between the displacement bank and the crude oil. The minimum interfacial tension is the lowest interfacial tension between the displacement bank and the crude oil that can be achieved by adjusting the salinity of the displacement bank.

In addition to changing interfacial tension for improving oil recovery, additional improvements in oil recovery can be obtained by selecting the salinities of the displacement fluids to minimize surfactant loss. Except at very low salinities, such as at salinities of 0.1 normal (N) or less, surfactant loss increases in proportion to salinity. It has been found that surfactant loss resulting from the mixing of micellar fluid with aqueous polymer-containing fluid having a higher salinity than the micellar fluid is greater than the surfactant loss resulting from the mixing of micellar fluid with aqueous polymer-containing fluid having a lower salinity. The most advantageous selection of salinities for the enhanced oil recovery of this invention is exemplified by the use of a displacement bank having an appropriate salinity contrast with the aqueous formation fluid and the polymer fluid component of the displacement bank having a lower salinity than the salinity of the micellar fluid component. Surfactant loss is even further reduced when the salinity of the polymer fluid is less than the salinity of the mixture of displacement fluid and aqueous formation fluid which exhibits the minimum interfacial tension between the mixture and crude oil.

As the micellar bank moves through the reservoir, the volume of surfactant in the micellar bank diminishes. The mechanisms which cause the surfactant to diminish are not completely understood, but are thought to include adsorption of surfactant on the reservoir rock and loss of surfactant due to mixing of the micellar fluid with the crude oil. Sufficient volume of micellar bank is needed for displacing crude oil from an injection well to a production well. This would require the use of about 3 to about 25 percent of the total pore volume of the portion of the reservoir from which crude oil is to be displaced. The loss of surfactant is determined experimentally by simulating the flow of a micellar bank through a reservoir. In making this experimental determination, it is preferred to flow the micellar fluid through a core taken from the reservoir and to utilize the same fluids that would be involved in the enhanced oil recovery project.

The micellar bank is displaced through the reservoir with a bank of lower mobility fluid which is formulated with sufficient polymer to increase the viscosity of the fluid. The movement of the polymer fluid through the reservoir is adjusted by the viscosity of the fluid. At an appropriate viscosity, the polymer fluid will move through the reservoir at the same rate as the crude oil. With the crude oil and lower mobility fluid moving through the reservoir at the same rate, the risk of the displacement fluid flowing through a portion of the crude oil is diminished. The bank of lower mobility fluid is commonly referred to as a mobility buffer bank or a polymer bank.

The micellar bank is displaced with a sufficient volume of polymer bank to provide a separation between the micellar bank and drive water. Drive water can be surface or formation water and is generally the water that is most convenient to the enhanced oil recovery site. Drive water is used to displace the micellar fluid and polymer bank from an injection well toward a production well. In some enhanced oil recovery projects, the drive water has a high salinity and is not compatible with the micellar bank. Therefore, the polymer bank can provide a separation between the micellar bank and the drive water. It can require about 30 to about 100 percent of the total pore volume of the portion of the reservoir from which crude oil is to be displaced to provide the separation between the micellar fluid and the drive water. The volume and appropriate viscosity of the polymer bank can be determined experimentally by the previously described procedures for determining the appropriate volume of the micellar bank. Additionally, reservoir simulation techniques that are well known to those skilled in the art of enhanced oil recovery can be valuable tools for use in the selection of the volume and appropriate viscosity of the polymer bank.

The formulation of displacement fluid at a salinity to minimize the interfacial tension between the displacement fluid and the displaced crude oil is illustrated in FIG. 1. These interfacial tension measurements were made on samples prepared by mixing about equal volumes of normal decane and an aqueous micellar fluid formulated by homogeneously mixing about 90 parts by volume potable water with about 5 parts by volume isopropyl alcohol, about 5 parts by volume petroleum mahogany sulfonate and the quantity of sodium chloride shown on FIG. 1. An interface was permitted to form between the normal decane and the micellar fluid, and the interfacial tension was measured with a spring drop interfacial tensiometer. It is illustrated by FIG. 1 that the selection of salinity is important for minimizing interfacial tension between oil and micellar fluid.

Figure 2:
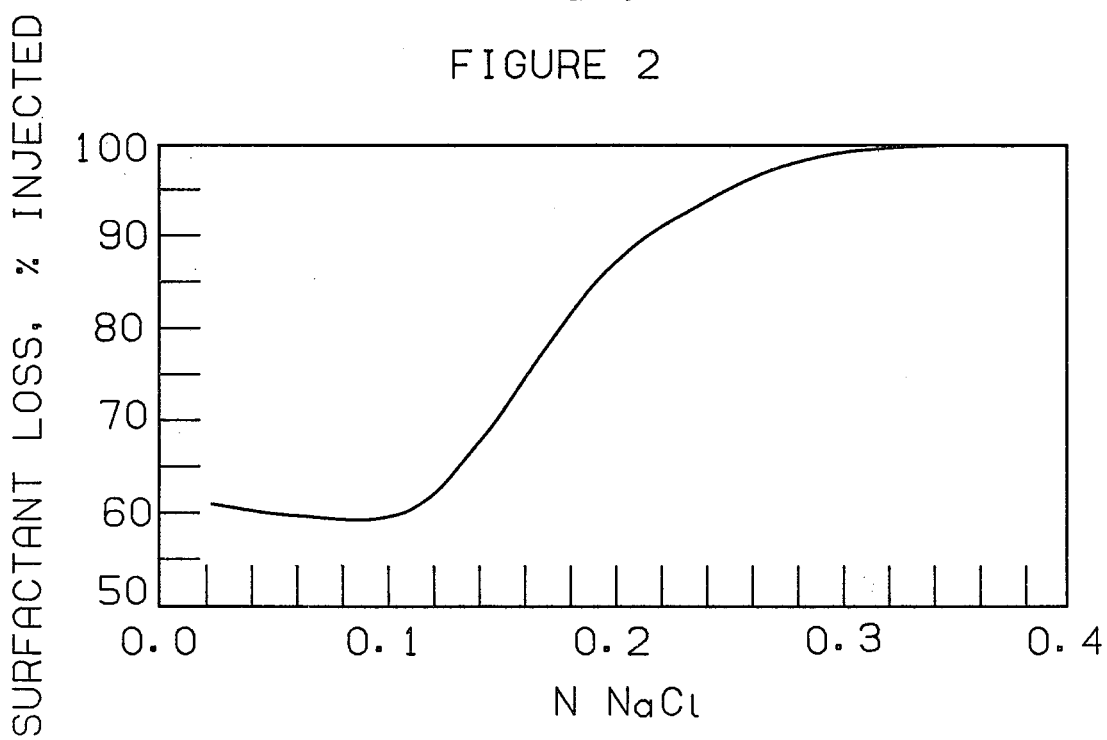
FIG. 2 shows the surfactant loss of displacement fluids having different salinities.

As the micellar fluid is being displaced through the reservoir, surfactant can be lost to the formation. Loss of surfactant in enhanced oil recovery is illustrated in FIG. 2. The surfactant loss, as obtained by material balance, is shown for core tests made by flowing four pore volumes of normal decane through approximately 1 foot (0.3 meter) long sections of approximately 2 inch (5 centimeters) diameter Berea sandstone cores, preflushing the cores with about 1 core volume of a preflush brine, displacing the oil and preflush with about 0.1 pore volume of a micellar slug and displacing the micellar slug with about 2 pore volumes of a polymer bank. In these tests, the preflush, micellar bank and polymer bank each contained the same concentration of sodium chloride. It is illustrated by FIG. 2 that surfactant loss increases in proportion to the salinity of the micellar fluid for salinities above about 0.1 N sodium chloride.

The micellar slugs illustrated in FIGS. 1 and 2 were formulated with the same constituents and in the same proportions. The polymer slug illustrated in FIG. 2 was formulated by homogeneously mixing 1000 parts per million Xanflood brand polysaccharide marketed by Kelco Company, potable water and the amount of sodium chloride shown on FIG. 2.

Oil recovery tests were also conducted with the same test procedure and sequence of fluids used to obtain the surfactant loss data illustrated on FIG. 2. The results of these oil recovery tests are shown in the following table. Also listed on this table are the salinities, as normality (N), of each of the fluids used in these tests.

| | Salinity | | | Percent of |
|---|---|---|---|---|
| Test No. | Preflush (N NaCl) | Micellar Bank (N NaCl) | Polymer Bank (N NaCl) | Pore Space Occupied by Oil at End of Test* |
| 1 | 0.03 | 0.03 | 0.03 | 29.8 |
| 2 | 0.03 | 0.2 | 0.2 | 10.0 |
| 3 | 0.03 | 0.37 | 0.37 | 25.7 |
| 4 | 0.03 | 0.03 | 0.37 | 14.3 |
| 5 | 0.03 | 0.37 | 0.03 | 6.8 |
| 6 | 0.2 | 0.2 | 0.2 | 12.3 |
| 7 | 0.2 | 0.03 | 0.2 | 11.0 |
| 8 | 0.2 | 0.37 | 0.2 | 11.3 |
| 9 | 0.2 | 0.2 | 0.37 | 11.0 |
| 10 | 0.2 | 0.2 | 0.03 | 3.0 |
| 11 | 0.37 | 0.37 | 0.37 | 25.3 |
| 12 | 0.37 | 0.2 | 0.2 | 12.2 |
| 13 | 0.37 | 0.03 | 0.03 | 8.0 |
| 14 | 0.37 | 0.03 | 0.2 | 10.8 |
| 15 | 0.37 | 0.03 | 0.37 | 13.1 |
| 16 | 0.37 | 0.37 | 0.03 | 2.3 |

*35 percent of the pore space of the cores used for these tests was occupied by oil prior to flowing preflush through the cores.

A comparison of each test shown on the above table illustrates that salinity contrast between the preflush and the displacement fluid provides improved oil recovery. The displacement fluid is a combination of the micellar fluid and the polymer containing fluid. In each test having a salinity contrast between the displacement fluid and the preflush, there can be a mixture of the preflush with the displacement fluid which would have a salinity of about 0.2 normal sodium chloride. This is the salinity that is shown on FIG. 1 to provide the lowest interfacial tension between this micellar fluid and oil. In addition to the salinity contrast, it is illustrated by Tests 5, 10, 13, and 16, that further improvement in oil recovery is obtained by formulating the polymer bank at a salinity below 0.2 normal sodium chloride, the salinity which exhibits the lowest interfacial tension between this oil and micellar fluid. Below this salinity for minimizing interfacial tension, it is shown on FIG. 2 that surfactant loss is also minimized.

While certain embodiments of the invention have been described for illustrative purposes, the invention is not limited thereto. Various other modifications or embodiments of the invention will be apparent to those skilled in the art in view of this disclosure. Such modifications or embodiments are within this scope of the disclosure.

What is claimed is:

1. A method of displacing crude oil through an oil-bearing subterranean reservoir containing aqueous formation fluid, which comprises:

injecting into the reservoir an aqueous displacement fluid comprising micellar fluid and aqueous polymer-containing fluid with the micellar fluid in immediate contact with the aqueous formation fluid and the polymer-containing fluid in immediate contact with the micellar fluid, said displacement fluid having a composition such that the interfacial tension between said displacement fluid and said crude oil will change and will decrease and then increase as said displacement fluid mixes with the aqueous formation fluid, and displacing said displacement fluid through at least a portion of the reservoir to displace crude oil.

2. A method of displacing crude oil through an oil-bearing subterranean reservoir containing aqueous formation fluid, which comprises:

injecting into the reservoir an aqueous displacement fluid comprising a micellar fluid and an aqueous polymer-containing fluid with the micellar fluid in immediate contact with the aqueous formation fluid and the aqueous polymer-containing fluid in immediate contact with the micellar fluid, said displacement fluid having a composition such that the interfacial tension between said displacement fluid and crude oil will change and pass through a minimum interfacial tension as shown on FIG. 1, as said displacement fluid mixes with aqueous formation fluid, and displacing said displacement fluid through at least a portion of the reservoir to displace crude oil.

3. A method of displacing crude oil through an oil-bearing subterranean reservoir containing an aqueous formation fluid, which comprises:

injecting in a reservoir an aqueous displacement fluid comprising micellar fluid and aqueous polymer-fluid with the micellar fluid in immediate contact with the aqueous formation fluid and the aqueous polymer-containing fluid in immediate contact with the micellar fluid, said displacement fluid having a composition such that the interfacial tension between said displacement fluid and crude oil will change and pass through an interfacial tension of about 100 millidynes/cm as said displacement fluid mixes with aqueous formation fluid, and displacing said displacement fluid through at least a portion of the reservoir to displace crude oil.

4. In a method of displacing crude oil through an oil-bearing subterranean reservoir containing saline aqueous formation fluid, wherein the reservoir is penetrated by at least one injection well which is in fluid communication through the reservoir with at least one production well penetrating the reservoir, which includes the step of injecting into the reservoir through said at least one injection well an aqueous fluid comprising a micellar fluid and an aqueous polymer-containing fluid with the micellar fluid in immediate contact with the aqueous formation fluid and the aqueous polymer-containing fluid in immediate contact with the micellar fluid, said aqueous fluid having a different salinity than the salinity of the aqueous formation fluid, and the step of displacing said injected fluid through at least a portion of the reservoir to displace crude oil toward said at least one production well under conditions such that the aqueous formation fluid mixes with said injected fluid, the improvement comprising:

selecting the salinity of said injected fluid such that as the injected fluid mixes with aqueous formation fluid, the salinity of the resulting mixtures and the interfacial tension between said mixtures and displaced crude oil changes and said interfacial tensions pass through a minimum interfacial tension.

5. In a method of displacing crude oil through an oil-bearing subterranean reservoir containing saline aqueous formation fluid, wherein the reservoir is penetrated by at least one injection well which is in fluid communication through the reservoir with at least one production well penetrating the reservoir, which includes the step of injecting into the reservoir through said at least one injection well an aqueous formation fluid comprising micellar fluid and aqueous polymer-containing fluid with the micellar fluid in immediate contact with the aqueous formation fluid and the aqueous polymer-containing fluid in immediate contact with the micellar fluid, said aqueous fluid having a different salinity from the salinity of the aqueous formation fluid and the step of displacing said injected fluid through at least a portion of the reservoir to displace crude oil toward said at least one production well under conditions such that the aqueous formation fluid mixes with said injected fluid, the improvement comprising:

selecting the salinity of said injected fluid such that as the injected fluid mixes with aqueous formation fluid, the salinity of the resulting mixtures and the interfacial tension between said mixtures and displaced crude oil change and said interfacial tension passes through a minimum interfacial tension as shown on FIG. 1.

6. In a method of displacing crude oil through an oil-bearing subterranean reservoir containing saline aqueous formation fluid, wherein the reservoir is penetrated by at least one injection well, which is in fluid communication through the reservoir with at least one production well penetrating the reservoir, which includes the step of injecting into the reservoir through at least one injection well aqueous fluid comprising micellar fluid and an aqueous polymer-containing fluid with the micellar fluid in immediate contact with the aqueous formation fluid and the aqueous polymer-containing fluid in immediate contact with the micellar fluid, said aqueous fluid having a different salinity than the salinity of the aqueous formation fluid and the step of displacement said injected fluid through at least a portion of the reservoir to displace crude oil towards said at least one production well under conditions such that the aqueous formation fluid mixes with said injected fluid, the improvement comprising:

selecting the salinity of said injected fluid such that the injected fluid mixes with the aqueous formation fluid, the salinity of the resulting mixture and the interfacial tension between said mixtures to displace crude oil changes and said interfacial tension passes through an interfacial tension of about 100 millidynes/cm.

7. The method of claims 1, 2, 5, or 6 wherein the interfacial tension passes through an interfacial tension of about 100 millidynes/cm.

8. The method of claims 3 or 6 wherein the interfacial tension passes through an interfacial tension of about 10 millidynes/cm.

9. The method of claims 1, 2, 5, or 6 wherein the salinity of said polymer-containing fluid is less than the salinity of said mixture having the minimum interfacial tension.

10. The method of claims 3 or 6 wherein the salinity of said polymer-containing fluid is less than the salinity of said mixture having an interfacial tension of less than about 100 millidynes/cm.

11. The method of claim 8 wherein the salinity of said polymer-containing fluid is less than the salinity of said mixture having an interfacial tension of about 10 millidynes/cm.

12. The method of claim 7 wherein the interfacial tension passes through an interfacial tension of about 10 millidynes/cm.

13. The method of claim 7 wherein the salinity of said polymer-containing fluid is less than the salinity of said mixture having an interfacial tension of less than about 100 millidynes/cm.

14. The method of claim 12 wherein the salinity of said polymer-containing fluid is less than the salinity of said mixture having an interfacial tension of about 10 millidynes/cm.

* * * * *